United States Patent [19]

Shimizu et al.

[11] Patent Number: 4,504,081
[45] Date of Patent: Mar. 12, 1985

[54] CHECK VALVE IN PRESSURE CONTROL CIRCUIT

[75] Inventors: Yasuo Shimizu; Nobuyoshi Asanuma; Yozo Kami, all of Saitama, Japan

[73] Assignee: Honda Giken Kogyo Kabushiki Kaisha, Tokyo, Japan

[21] Appl. No.: 429,313

[22] Filed: Sep. 30, 1982

[30] Foreign Application Priority Data

Mar. 11, 1982 [JP] Japan .................................. 57-39232

[51] Int. Cl.³ .......................................... B60G 11/26
[52] U.S. Cl. ............................. 280/714; 55/DIG. 17; 137/469; 280/711
[58] Field of Search ................ 280/714, 711; 137/469; 55/DIG. 17

[56] References Cited

U.S. PATENT DOCUMENTS

| 2,844,385 | 7/1958 | Pribonic | 280/714 |
| 3,373,764 | 3/1968 | Munn | 137/469 |
| 4,071,337 | 1/1978 | Evans | 55/DIG. 17 |
| 4,142,549 | 3/1979 | Autry | 137/469 |
| 4,149,827 | 4/1979 | Hofmann, Jr. | 417/53 |
| 4,226,261 | 10/1980 | Ekeleme, Jr. et al. | 137/469 |
| 4,327,936 | 5/1982 | Sekiguchi | 280/711 |
| 4,360,191 | 11/1982 | Urushiyama | 280/714 |

FOREIGN PATENT DOCUMENTS 56-87312 7/1981 Japan .

Primary Examiner—Joseph F. Peters, Jr.
Assistant Examiner—Kenneth R. Rice
Attorney, Agent, or Firm—Armstrong, Nikaido, Marmelstein & Kubovcik

[57] ABSTRACT

An integrated valve unit for a pressure control circuit which comprises a case, a drier wholely contained in the case, and a check valve formed and positioned in an inlet of the case having a longitudinal axis perpendicular to the longitudinal axis of the case. The check valve includes a cylinder chamber formed in the case having two end faces and a side wall, a fluid inlet port formed in one of the end faces, a pair of discharge ports in the side wall longitudinally spaced from each other and opening into the case, an axially slidable piston inserted into the chamber, a biasing member urging the piston towards one end face having the fluid inlet port formed therein, and an elastic seal member fixed to the piston member. The piston is capable of selectably closing the discharge ports upon axial sliding thereof. The elastic seal member is capable of sealing the portion of one end face including the fluid inlet port as the piston member slides toward that one end face. The elastic seal member can be shaped as a cup-shaped member fixed to the inlet port end face of a cylindrical piston and can have a smaller area then that of the piston end face to which it is affixed. The difference in areas of the seal member and the face of the piston operates to provide a substantially instantaneous opening and closing response to the valve which effectively prevents chattering and vibration.

12 Claims, 7 Drawing Figures

CHECK VALVE IN PRESSURE CONTROL CIRCUIT

BACKGROUND OF THE INVENTION

1. Field of the Invention

The present invention relates to an improvement of a check valve disposed in a pressure circuit wherein a fluid serves as a control medium.

2. Description of Relevant Art

Check valves disposed in a pressure circuit are generally of a construction which includes a valve body seated on biasing means such as a spring, positioned in an oil path of a valve case for the purpose of closing the same path, and adapted to permit flow only in a predetermined direction of fluid having a pressure exceeding a preset value.

Check valves of this sort are adapted to open and close at a pressure level preset for their operation as a limit, but in the vicinity of such preset level of pressure the opening and closing motions of the valve are not effected instantaneously. The result is that changes in fluid pressure sometimes cause the valve body to vibrate and the valve exhibits the so-called chattering phenomenon.

In view of the above-mentioned problem associated with check valves of this sort, the present inventors have continued the present invention in order to overcome such problem effectively.

SUMMARY OF THE INVENTION

According to the present invention, there is provided a check valve in a pressure control circuit including a pressure line capable of carrying therethrough a pressurized fluid and a discharge line capable of discharging the fluid, which check valve comprises a fluid inlet ports connected to the pressure line, a pair of fluid discharge ports connected to the discharge line, a cylinder chamber in one of both end faces of which is formed and open the fluid inlet hole and in a side wall of which are formed and open the discharge holes, a piston member inserted in the cylinder chamber axially slidably and capable of closing the discharge holes selectively at the time of its axial sliding, a biasing member for urging the piston member toward the above one end face of the cylinder chamber at all times, and an elastic seal member fixed to the piston member and capable of sealing the portion of the above one end face including the fluid inlet hole as the piston member slides toward the above end face side.

It is the object of the present invention to provide a check valve in a pressure control circuit having a high response characteristic in its opening and closing motions and capable of effectively preventing chattering and vibration.

Preferred embodiments of the present invention will be described in detail hereinunder with reference to the accompanying drawings, from which further features, objects and advantages of the present invention will become apparent.

DETAILED DESCRIPTION OF PREFERRED EMBODIMENTS

Figure 1:
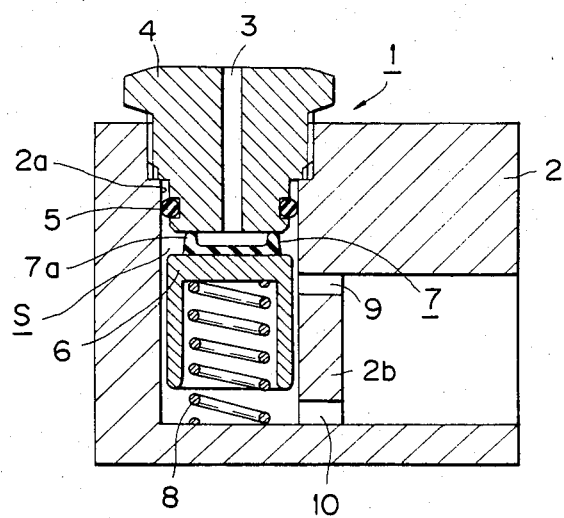
FIG. 1 is a schematic elevational sectional view of a check valve in a pressure control circuit according to a first embodiment of the present invention.
Figure 6:
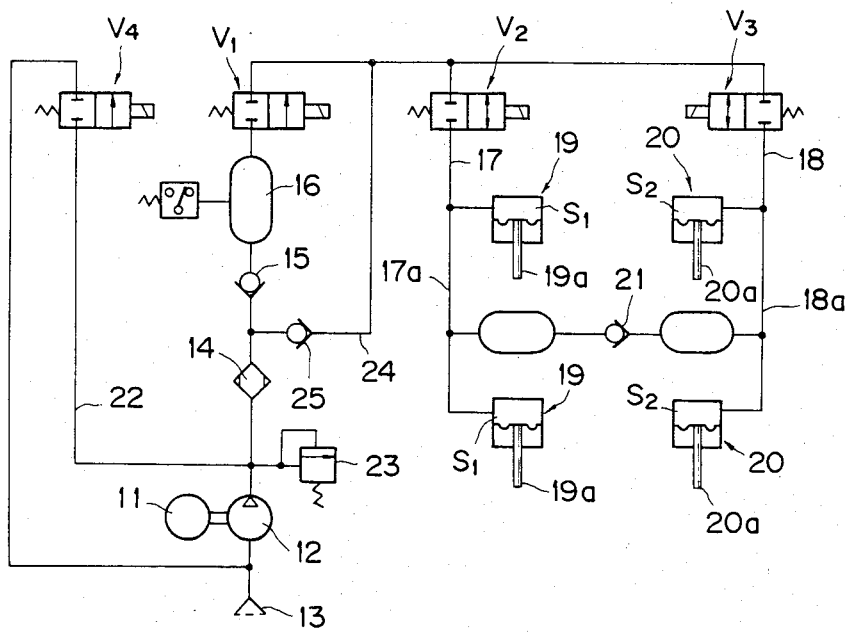
FIG. 6 is a circuit diagram of a pressure control system in a height adjusting device of a vehicle provided with a check valve according to a second embodiment of the present invention.

Referring first to FIG. 1, there is illustrated a construction of a check valve 1, wherein a cylinder bore 2a is formed in a valve case 2, and in an open end portion of the bore 2a is threadedly fitted a closure member 4. The air gap between the bore and the closure member is made airtight by means of a seal ring 5. The valve body 4 has a fluid inlet port 3 formed centrally therethrough. A cylinder chamber S is formed within the valve case 2 by the bore 2a. In the interior of the cylinder chamber S is inserted a preferably cup-shaped cylindrical piston 6 vertically slidable with its open portion facing down as shown in FIG. 6, and to the upper closed end face of the piston 6 is fixed an upwardly opening, cup-shaped elastic packing 7 in opposed relation to the open portion of the fluid inlet port 3 formed in the closure member 4, the elastic packing 7 having a ring-like peripheral wall 7a with a diameter smaller than that of the piston 6. The piston 6 is resiliently biased upward by a spring 8 which is disposed compressedly in the interior of the piston 6, so that the wall 7a of the elastic packing 7 fixed to the upper end face of the piston 6 is urged against the lower end of the closure member 4 and the peripheral wall 7a seals the fluid inlet port 3 from communication with the cylinder chamber S.

On the other hand, in a cylinder side wall 2b of the valve case 2 are formed upper and lower discharge ports 9 and 10 which allow the cylinder chamber S to communicate selectively with a discharge system as will be described later as the piston 6 slides in the vertical direction.

The following description is now provided of the operation of the check valve 1 having the above-mentioned construction, with reference to FIGS. 2 through 5.

Figure 2:
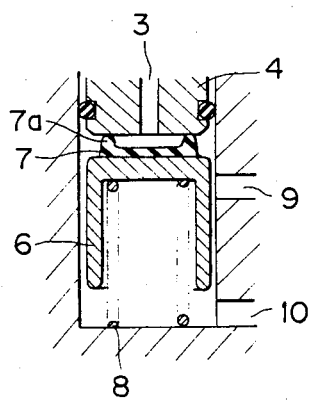
FIG. 2 is a sectional view of a principal portion of the check valve of FIG. 1, showing a closed state of the valve.

First, in a closed state of the check valve 1 as shown in FIG. 2, the pressure p of fluid acts on the interior of the elastic packing 7 through the fluid inlet port 3. The pressure-receiving portion of the packing 7 is the bottom area inside the wall 7a, and the pressure from the inlet port 3 results in a force F (=p.a) which tries to force down the piston 6. The force F is preset smaller than the normal biasing force R of the spring 8 (F<R), and due to the difference ΔF (=R−F) between those forces, the elastic packing 7 is urged to the closure member 4 side to provide a complete seal against the fluid.

Figure 5:
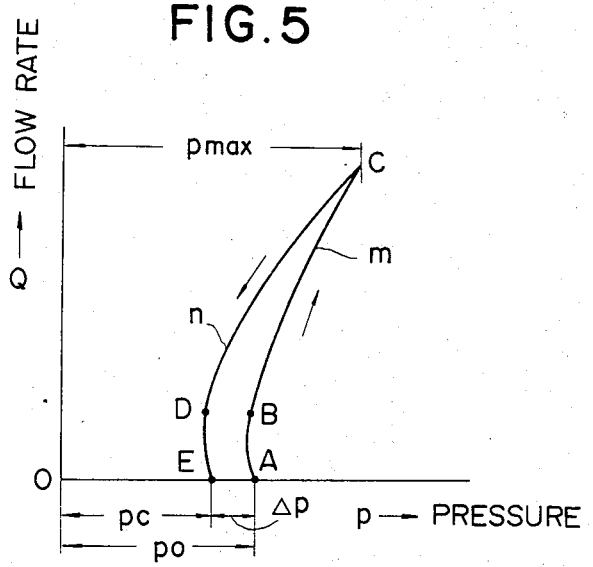
FIG. 5 is a graph showing the relationship between pressure and flow of fluid passing through the check valve of FIG. 1.

This closed state shown in FIG. 2 is maintained until the pressure p increases and reaches a pressure $p_o$ at point A shown in FIG. 5. That is, the point A indicates a point at which the check valve 1 begins to open, and at this time the force Fo ($=p_o.a$) which acts to force down the piston 6 and the biasing force R of the spring 8 are balanced (Fo=R). In FIG. 5, pressure p and flow rate Q are plotted along the axes of abscissa and that of ordinate, respectively.

Figure 3:
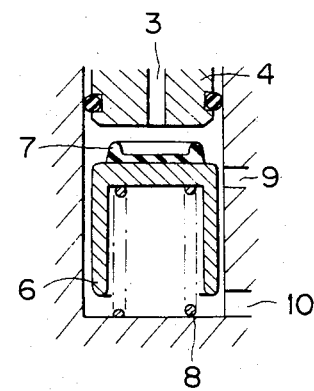
FIG. 3 also is a sectional view of the principal portion of the check valve of FIG. 1, wherein the valve is about to shift from its closed state to an open state.
Figure 4:
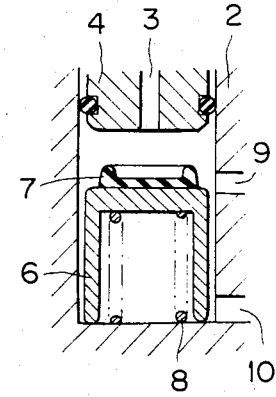
FIG. 4 also is a sectional view of the principal portion of the check valve of FIG. 1, showing an open state of the valve.

When a slight increase in fluid pressure p from the state of point A in FIG. 5 causes the piston 6 to move slightly downward as shown in FIG. 3, the packing 7 leaves the closure member 4, whereupon the fluid pressure p acts on the entire upper end face of the piston 6. If this pressure receiving area is assumed to be A, it is larger than the foregoing pressure-receiving area a (A>a); therefore the force F acting to force down the piston 6 increases suddenly up to $F_1$ ($=Po.A$), so that the piston 6 goes through the state shown in FIG. 3 and rapidly descends to the lower surface portion of the cylinder 2a as shown in FIG. 4. This downward movement of the piston 6 causes the check valve 1 to assume an open state; that is, the upper discharge hole 9 opens and allows the fluid to pass therethrough and flow to the discharge system. The point at which the piston 6 contacts and begins to adhere to the lower surface of the cylinder 2a is indicated at point B in FIG. 5.

As the piston 6 moves downward, the fluid within the piston 6 flows out to the discharge system through the lower discharge hole 10 without being confined and compressed within the interior, thus permitting a smooth downward movement of the piston 6. Moreover, as the packing 7 leaves the closure member 4, the pressure-receiving area of the piston 6 suddenly expands from a to A with the result that the operation from the closed valve condition (FIG. 2) to the open valve condition (FIG. 4) is performed under approximately the same pressure $p_o$. Consequently, as shown in FIG. 5, the characteristic curve from point A to point B has a large gradient, and in the range of small flow rates, it is approximately at right angles to the axis of abscissa. This means that the check valve 1 is opened in an instant.

And even if the fluid pressure p increases from the state shown in FIG. 4 wherein the piston 6 closely adheres to the lower surface of the cylinder 2a, the piston 6 is still held in close contact with the said lower surface by virtue of a stronger force, thus allowing the upper discharge hole 9 to remain in its open condition. Therefore, it is possible to increase the fluid pressure p as high as possible from point B as shown in FIG. 5, and with this increase of pressure p the flow rate Q of fluid which flows out to the discharge system through the upper discharge hole 9 increases along a characteristic curve m. It is here assumed that in this way the fluid pressure p has been raised up to a pressure pmax at point C in FIG. 5.

Then, if the fluid pressure p decreases gradually from pmax, the flow rate Q also decreases along a characteristic curve n shown in FIG. 5, and the open state shown in FIG. 4 is maintained from point C up to point D, that is, until the fluid pressure p substantially reaches $p_c$ from pmax, the point D being a point at which the force p.A based on the fluid pressure p acting on the entire upper end face (pressure receiving area A) of the piston 6 and the biasing force Rc in the fully compressed state of the spring 8 are balanced.

From the point D, even a slight decrease of fluid pressure p causes the piston 6 to move upward and the packing 7 comes into close contact with the lower end face of the closure member 4 to thereby close the fluid inlet port 3, whereupon the pressure receiving area on the piston 6 side is limited to the interior (area a) of the peripheral wall 7a of the packing 7, so that the packing 7 is urged to the closure member 4 by means of the spring 8 and provides the state of point E in FIG. 5, and thus the valve 1 ensures a high sealing characteristic.

Because of the change in pressure-receiving area of the piston 6, there occurs a difference of $\Delta p$ ($=p_o-p_c$) as shown in FIG. 5 between the pressure $p_o$ at which the valve 1 begins to open and the pressure $p_c$ at which it completely closes. As shown in the same figure, the characteristic curve m for valve opening and that n for valve closing do not overlap each other, and thus hysteresis exists in the characteristics.

The opening and closing motions of the check valve 1 are done quickly and positively, and once opened, its open state (the state shown in FIG. 4) is maintained firmly, so that the piston does not vibrate even with changes in fluid pressure and therefore the valve 1 does not undergo chattering. Consequently, a quiet and highly responsive operation is attained.

As previously noted, moreover, the sealing characteristic in a closed state of the valve is improved, and consequently it is possible to retain an appropriate residual pressure in the system.

The check valve 1 is applicable to both cases where the control liquid is gas and where it is fluid.

Figure 7:
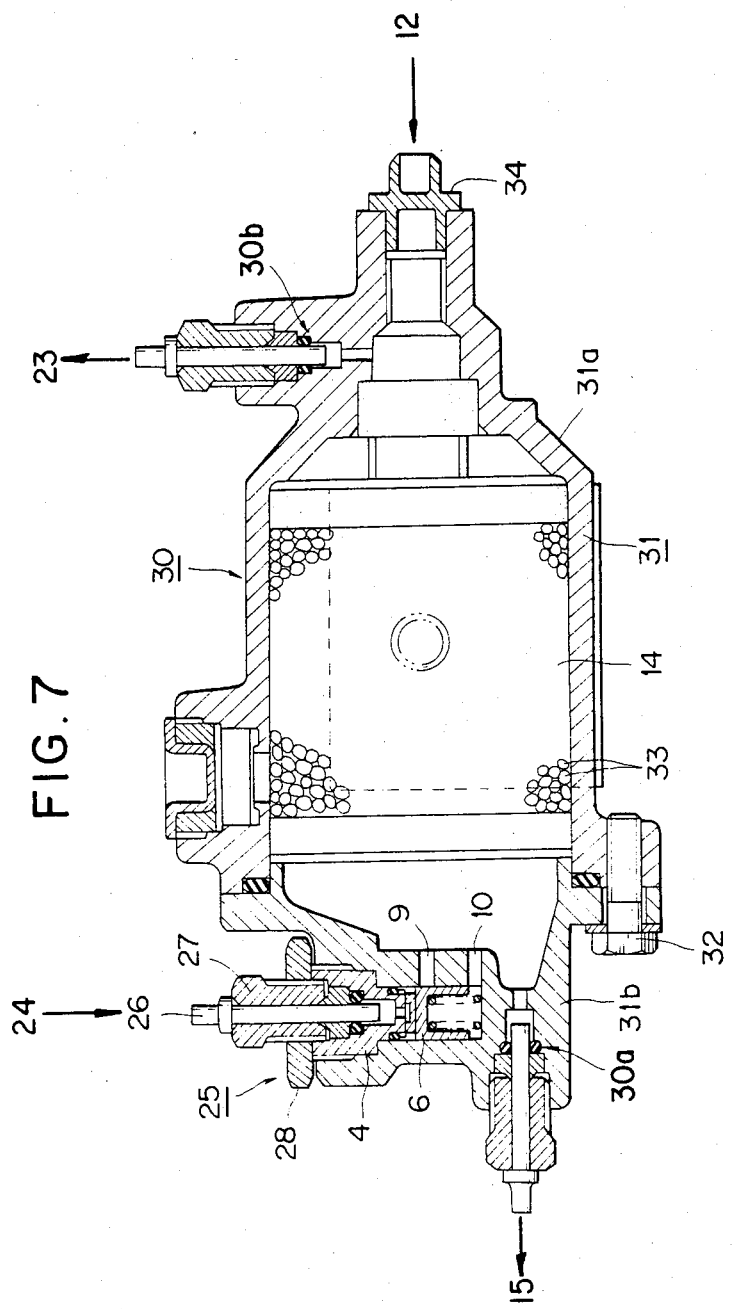
FIG. 7 is a elevational sectional view of a valve unit which integrally includes the check valve used in the vehicular height adjusting device of FIG. 6.

Referring to FIGS. 6 and 7, there is shown, as a concrete application example of a check valve according to the present invention, an embodiment wherein the valve is applied to a vehicular height adjusting system. FIG. 6 is a circuit diagram of a pressure control system in the vehicular height adjusting system, and FIG. 7 is a sectional side view of a valve unit in the same system.

The vehicular height adjusting system shown herein is of the type wherein the height of a vehicle is adjusted by supplying and discharging air pressure to and from an air chamber attached to each of a pair of right and left hydraulic dampers disposed at front and rear portions of the vehicle.

Referring first to FIG. 6, there is illustrated a construction of a control system in this vehicular height adjusting system, wherein a filter 13 is connected to an intake side of an air compressor 12 which is driven by a motor 11, while to a discharge side of the compressor 12 is connected an accumulator 16 via a drier 14 and a check valve 15. The outlet side of the accumulator 16 is branched to lines 17 and 18 via a solenoid type change-over valve $V_1$, one line 17 being connected through a change-over valve $V_2$ to air chambers $S_1$ of a pair of right and left front cushions 19 which suspend front wheels, while the other line 18 is connected through a change-over valve $V_3$ to air chambers $S_2$ of a pair of right and left rear cushions 20 which suspend rear wheels.

Furthermore, as shown in the figure, a differential pressure control valve 21 is interposed between a line 17a which interconnects the front cushions 19 and a line 18a which interconnects the rear cushions 20.

On the other hand, between intake and discharge sides of the air compressor 12 is connected an exhaust line 22 which forms a closed loop, with a solenoid type change-over valve $V_4$ being disposed in the exhaust line 22, and a relief valve 23 is disposed between the compressor 12 and the drier 14.

Branched from the side of the drier 14 is a line 24 which is connected through a check valve 25 to the down-stream side of the change-over valve $V_1$.

The check valve 25, as shown in FIG. 7, together with drier 14 form a compact, integrated valve unit 30. The internal structure of the check valve 25 is the same as that of the check valve 1 shown in FIG. 1, and in FIG. 7 the same parts as those shown in FIG. 1 are indicated with the same reference numerals and their explanation will, therefore, be omitted at this point. The valve unit 30 is connected to check valve 15 through first outlet 30a, and to relief valve 23 through second outlet 30b.

In FIG. 7, a bolt member 27 with a fluid inlet pipe 26 line 24 inserted and fixed therein is threadedly fitted in the central portion of a closure member 4 of the check valve 25, and its pivotal movement is locked by a lock nut 28 which is threadedly engaged with the outer periphery of the bolt member 27.

The case 31 of the valve unit 30 is constituted of right and left half cases 31a and 31b which are integrally joined with bolt 32, and the interior of the drier 14 constructed within the case 31 is filled with moisture-absorbing materials 33 comprising active carbon, etc. The right end portion of the case 31 is connected through a plug 34 to the discharge side of the air compressor 12. The operation of the so-constructed vehicular height adjusting system will be described hereinunder with reference to FIG. 6.

The outside air, after being purified by passing through the filter 13, is pressurized by the air compressor 12, then dehumidified by the drier 14, thereafter passes through the check valve 15 and is stored in the accumulator 16. Thus, air pressurized to a predetermined level is always stored within the accumulator 16.

If the change-over valves $V_1$, $V_2$ and $V_3$ are opened, the pressurized air within the accumulator 16 is introduced into the air chambers $S_1$ of the front cushions 19 and also into the air chambers $S_2$ of the rear cushions 20, and forces down the piston rods 19a and 20a to thereby raise the entire height of the vehicle body. If only the change-over valve $V_2$ is opened with the change-over valve $V_3$ in a closed state, the pressurized air is introduced into the air chambers $S_1$ of the front cushions 19 to raise the front portion of the vehicle body. Conversely, if only the change-over valve $V_3$ is opened with the change-over valve $V_2$ in a closed state, the pressurized air is introduced into the air chambers $S_2$ of the rear cushions 20 to lower the rear portion of the vehicle body. Furthermore, by the action of the differential pressure control valve 21, the internal pressure of the air chambers $S_1$ of the front cushions 19 and that of the air chambers $S_2$ of the rear cushions 20 are held in a predetermined ratio.

To lower the vehicular height, the change-over valves $V_2$, $V_3$ and $V_4$ may be opened after closing the change-over valve $V_1$, whereby the pressurized air within the air chambers $S_1$ and $S_2$ is discharged into the atmosphere through the line 24, check valve 25, drier 14, line 22, change-over valve $V_4$ and filter 13, with the result that the internal pressure of the air chambers $S_1$ and $S_2$ is decreased whereby the vehicular height is lowered throughout the entirety of the vehicle body.

In the above process of discharging the pressurized air into the atmosphere, the check valve 25 performs an exact, quiet and highly responsive operation like the case previously noted.

Although an example of application of the check valve of the present invention to the vehicular height adjusting system has been described, the check valve of the invention is applicable to pressure control circuits of any other devices.

What is claimed is:

1. In a pressure control circuit including an integrated valve unit, said integrated valve unit comprising a case having a longitudinal axis, a first inlet, a second inlet, a first outlet, and a second outlet; a drier wholly contained in said case; and a check valve formed and positioned in said second inlet and having a longitudinal axis perpendicular to said axis of said case, said check valve comprising:
   a cylinder chamber formed in said case and having two end faces and a side wall,
   a fluid inlet port formed in one of said end faces,
   a pair of discharge ports formed in said side wall longitudinally spaced apart from each other and opening into said case,
   an axially slideable piston member inserted in said cylinder chamber, said piston member being capable of selectively closing said discharge ports upon axial sliding thereof,
   a biasing member urging said piston member toward said one end face having said fluid inlet port formed therein, and
   an elastic seal member fixed to said piston member, said elastic seal member being capable of sealing the portion of said one end face, including said fluid inlet port as said piston member slides toward said one end face.

2. A valve unit according to claim 1, wherein said seal member comprises a generally circular bottom portion opposed to said one end face of said cylinder chamber and a generally ring-like peripheral portion which stands up from the peripheral edge of said bottom portion toward said one end face of said cylinder chamber.

3. A valve unit according to claim 1, wherein each of said pair discharge ports is formed near either of said two end faces of said cylinder chamber.

4. A valve unit according to claim 1, wherein said one end face of said cylinder chamber is defined by a closure member with said fluid inlet port formed longitudinally therethrough.

5. A pressure control circuit containing a valve unit according to any one of claims 1, 2, 3 or 4 wherein said pressure control circuit further comprises a pressure control circuit for controlling the pressure of a hydraulic operating fluid in a vehicular height adjusting mechanism of a vehicle.

6. A pressure control circuit according to claim 5, wherein said vehicle has a pair of front wheels and a pair of rear wheels, and said vehicular height adjusting mechanism comprises a pair of front cushions each of which suspends either of said paired front wheels, a pair of rear cushions each of which suspends either of said paired rear wheels, said pressure control circuit being capable of supplying and discharging a pressurized fluid to and from said cushions, and fluid feed means for feeding said pressurized fluid to said pressure control circuit.

7. A pressure control circuit according to claim 6, wherein said fluid comprises air, and said fluid feed means comprises said valve unit, a compressor connected to the atmosphere and to said first inlet of said valve unit, an accumulator connected to said first outlet of said valve unit through a non-return mechanism, and a relief valve connected to said second outlet of said valve unit.

8. The valve defined in claim 1 wherein the spacing of one of said discharge ports relative to the size of the piston is such that said one discharge port is closed when said seal member seals off the inlet port.

9. The valve defined in claim 8 wherein a predetermined pressure of fluid entering the inlet port slides the piston instantaneously to the other end face of the chamber and thereby opens the closed discharge port.

10. The valve defined in claim 9 wherein the other discharge port is formed in the side wall of the chamber adjacent the other end face thereof.

11. The valve defined in claim 10 wherein said closed discharge port is opened and the other discharge port is closed when fluid pressure slides the piston into contact with the other end face of said chamber.

12. The valve defined in claim 1 wherein said one end face is formed by a removable closure member, and further includes a seal ring located between the outer periphery of said closure member and the inner periphery of said chamber to seal the gap there-between.

* * * * *